United States Patent
Omori

(10) Patent No.: US 10,876,540 B2
(45) Date of Patent: Dec. 29, 2020

(54) ELECTROMAGNETIC ROTATING DEVICE AND VACUUM PUMP EQUIPPED WITH ELECTROMAGNETIC ROTATING DEVICE

(71) Applicant: Edwards Japan Limited, Yachiyo (JP)

(72) Inventor: Hideki Omori, Chiba (JP)

(73) Assignee: Edwards Japan Limited, Yachiyo (JP)

( * ) Notice: Subject to any disclaimer, the term of this patent is extended or adjusted under 35 U.S.C. 154(b) by 645 days.

(21) Appl. No.: 14/443,102

(22) PCT Filed: Oct. 9, 2013

(86) PCT No.: PCT/JP2013/077510
§ 371 (c)(1),
(2) Date: May 15, 2015

(87) PCT Pub. No.: WO2014/083946
PCT Pub. Date: Jun. 5, 2014

(65) Prior Publication Data
US 2015/0303836 A1    Oct. 22, 2015

(30) Foreign Application Priority Data
Nov. 30, 2012  (JP) .................................. 2012-262591

(51) Int. Cl.
F04D 29/058    (2006.01)
F04D 25/06     (2006.01)
(Continued)

(52) U.S. Cl.
CPC ......... *F04D 29/058* (2013.01); *F04D 19/048* (2013.01); *F04D 25/06* (2013.01);
(Continued)

(58) Field of Classification Search
CPC ...... F04D 19/042; F04D 19/048; F04D 25/06; F04D 25/0606; F04D 25/062;
(Continued)

(56) References Cited

U.S. PATENT DOCUMENTS 5,961,291 A * 10/1999 Sakagami ............. F04D 19/048
                                                          415/132
6,147,425 A * 11/2000 Ueyama ............... F16C 32/0442
                                                          310/90.5
(Continued)

FOREIGN PATENT DOCUMENTS

CN      1875540 A     12/2006
CN      1930400 A      3/2007
(Continued)

OTHER PUBLICATIONS

Translation and Original International Search Report dated Dec. 24, 2013 received in PCT/JP2013/077510, 5 pgs.

*Primary Examiner* — Bryan M Lettman
*Assistant Examiner* — Charles W Nichols
(74) *Attorney, Agent, or Firm* — Shumaker & Sieffert, P.A.

(57) ABSTRACT

An electromagnetic rotating apparatus may include an electromagnet winding that consumes power generated during regeneration. A motor voltage monitoring circuit detects that a voltage at a motor driving main circuit is higher than a voltage during normal operation, due to overshoot or the like after arrival at a set speed during deceleration or acceleration of a motor. The motor voltage monitoring circuit transmits a high-voltage detection signal to a braking current adjusting circuit and a magnetic bearing control circuit. Upon receiving the high-voltage detection signal, the braking current adjusting circuit reduces a braking current command value for the motor so as to maintain an excitation voltage for the motor constant or reduce this excitation voltage, and an amplifier control circuit in the magnetic bearing control circuit increases a bias current flowing through an electromagnet winding to increase power consumption.

8 Claims, 11 Drawing Sheets

(51) Int. Cl.
*F16C 32/04* (2006.01)
*F04D 19/04* (2006.01)
*F04D 27/02* (2006.01)
*H02P 3/18* (2006.01)
*H02P 6/24* (2006.01)
*H02P 6/08* (2016.01)
*F04D 29/053* (2006.01)
*H02P 3/14* (2006.01)

(52) U.S. Cl.
CPC ..... *F04D 25/0606* (2013.01); *F04D 27/0261* (2013.01); *F04D 29/053* (2013.01); *F16C 32/0457* (2013.01); *H02P 3/14* (2013.01); *H02P 3/18* (2013.01); *H02P 6/085* (2013.01); *H02P 6/24* (2013.01); *F16C 2360/45* (2013.01)

(58) Field of Classification Search
CPC .. F04D 4/0633; F04D 25/064; F04D 25/0646; F04D 27/004; F04D 27/0261; F04D 29/048; F04D 29/053; F04D 29/058; F16C 32/0457; F16C 32/0459; F16C 32/0461; F16C 32/0463; F16C 2360/45; H02P 6/14; H02P 6/16; H02P 7/29; H02P 27/06; H02P 27/08; H02P 3/18; H02P 3/24; H02P 23/08; H02P 3/14; H02P 6/085; H02P 6/24
See application file for complete search history.

(56) References Cited

U.S. PATENT DOCUMENTS

| | | | |
|---|---|---|---|
| 6,455,966 B1* | 9/2002 | Barada | F16C 32/0444 |
| | | | 310/90.5 |
| 7,053,582 B2* | 5/2006 | Ueyama | F16C 32/0455 |
| | | | 310/90.5 |
| 7,233,124 B2 | 6/2007 | Takeoka et al. | |
| 7,786,636 B2 | 8/2010 | Kawashima | |
| 2002/0047683 A1* | 4/2002 | Kawashima | H02P 6/14 |
| | | | 318/721 |
| 2007/0188966 A1* | 8/2007 | Kawashima | F04D 19/042 |
| | | | 361/144 |
| 2008/0206079 A1* | 8/2008 | Okuda | F04D 19/042 |
| | | | 417/423.4 |

FOREIGN PATENT DOCUMENTS

| | | |
|---|---|---|
| JP | H04271288 A | 9/1992 |
| JP | H07279962 A | 10/1995 |
| JP | H1047346 A | 2/1998 |
| JP | 2002180990 A | 6/2002 |
| JP | 2003028072 A | 1/2003 |
| JP | 2004112877 A | 4/2004 |
| JP | 2005022321 A | 1/2005 |
| JP | 2005198441 A | 7/2005 |

* cited by examiner

ELECTROMAGNETIC ROTATING DEVICE AND VACUUM PUMP EQUIPPED WITH ELECTROMAGNETIC ROTATING DEVICE

This application is a national stage entry under 35 U.S.C. § 371 of International Application No. PCT/JP2013/077510, filed Oct. 9, 2013, which claims the benefit of JP Application 2012-262591, filed Nov. 30, 2012. The entire contents of International Application No. PCT/JP2013/077510 and JP Application 2012-262591 are incorporated herein by reference.

TECHNICAL FIELD

The present invention relates to an electromagnetic rotating apparatus and a vacuum pump having the electromagnetic rotating apparatus.

BACKGROUND

With recent development of electronics, demands for semiconductors such as memories and integrated circuits have been growing rapidly. These semiconductors are manufactured, for example, by doping impurities into a semiconductor substrate with an extremely high purity to provide the semiconductor substrate with electric properties or forming and laminating fine circuit patterns on the semiconductor substrate. These operations need to be performed in a chamber in a vacuum state in order to avoid the adverse effects of dust in the air or the like. To ventilate the chamber, a vacuum pump is generally used as a pump apparatus. In particular, a turbo-molecular pump—one type of vacuum pump—is frequency used because of, for example, a lower level of residual gas and high maintainability thereof.

Furthermore, steps of manufacturing a semiconductor include a large number of steps for allowing various process gases to act on a semiconductor substrate. The turbo-molecular pump is used not only to vacuumize the inside of the chamber but also to discharge the process gases from the inside of the chamber. Moreover, the turbo-molecular pump is used in a facility for an electronic microscope or the like to set the environment in a chamber for the electronic microscope or the like to a high vacuum state in order to prevent refraction of electron beams and the like caused by the presence of dust and the like.

SUMMARY

A turbo-molecular pump for setting the environment in a chamber for the electronic microscope or the like to a high vacuum state may include a turbo-molecular pump main body that allows the gas to be sucked and discharged from the chamber for a semiconductor manufacturing apparatus, an electronic microscope, or the like and a control apparatus that controls the turbo-molecular pump main body. FIG. 9 depicts a longitudinal cross-sectional view of the turbo-molecular pump main body.

In FIG. 9, in a turbo-molecular pump 100, an inlet port 101 is formed at an upper end of a tubular outer cylinder 127. Inside the outer cylinder 127, a rotor 103 is provided which includes a plurality of rotor blades 102a, 102b, 102c, . . . radially formed around a peripheral portion of the rotor at multiple stages, the rotor blades 102a, 102b, 102c, . . . being turbine blades allowing the gas to be sucked and discharged. A rotor shaft 113 is attached to the center of the rotor 103. The rotor shaft 113 is supported so as to float in the air and subjected to position control, for example, by a magnetic bearing for five-axis control.

In an upper radial electromagnet 104, four electromagnets are arranged such that the electromagnets of each of two pairs of electromagnets are arranged on an X axis and a Y axis and such that the electromagnets of each of different two pairs of electromagnets are arranged in a positive direction and in a negative direction (although not depicted in the drawings, the electromagnets are denoted by 104X+, 104X−, 104Y+, and 104Y−). An upper radial sensor 107 including four electromagnets is provided in proximity to and in association with the upper radial electromagnet 104. The upper radial sensor 107 is configured to detect radial displacement of the rotor 103 to transmit the relevant signal to the control apparatus.

In the control apparatus, based on a displacement signal detected by the upper radial sensor 107, a magnetic bearing control circuit excites and controls the upper radial electromagnet 104 via a compensation circuit with a PID adjustment function to adjust an upper radial position of the rotor shaft 113. The rotor shaft 113 is formed of a high-magnetic-permeability material (iron or the like) and attracted by a magnetic force of the upper radial electromagnet 104. Such adjustment is made independently in the direction of the X axis and in the direction of the Y axis.

Furthermore, a lower radial electromagnet 105 and a lower radial sensor 108 are arranged similarly to the upper radial electromagnet 104 and the upper radial sensor 107 to adjust a lower radial position of the rotor shaft 113 similarly to the upper radial position (for the lower radial electromagnet 105, the electromagnets are denoted by 105X+, 105X−, 105Y+, and 105Y− as needed).

Moreover, axial electromagnets 106A and 106B are arranged above and below a disc-shaped metal disc 111 to sandwich the same that is provided below the rotor shaft 113. The metal disc 111 is formed of a high-magnetic-permeability material such as iron. An axial sensor 109 is provided to detect axial displacement of the rotor shaft 113 so that an axial displacement signal is transmitted to the control apparatus.

Based on this axial displacement signal, the axial electromagnets 106A and 106B are excited and controlled by the magnetic bearing control circuit via the compensation circuit with the PID adjustment function, the magnetic bearing control circuit and the compensation circuit being included in the control apparatus. The axial electromagnet 106A magnetically attracts the metal disc 111 upward. The axial electromagnet 106B magnetically attracts the metal disc 111 downward.

Thus, the control apparatus appropriately adjusts the magnetic force applied to the metal disc 111 by the axial electromagnets 106A and 106B to allow the rotor shaft 113 to magnetically float in the axial direction, thus holding the rotor shaft 113 in the space in a non-contact manner. The magnetic bearing control circuit exciting and driving the upper radial electromagnet 104, the lower radial electromagnet 105, and the axial electromagnets 106A and 106B will be described below.

On the other hand, a motor 121 includes a plurality of magnetic poles peripherally arranged so as to surround the rotor shaft 113. Each of the magnetic poles is controlled by the control apparatus so as to rotationally drive the rotor shaft 113 via an electromagnetic force acting between the magnetic pole and the rotor shaft 113.

Furthermore, a number-of-rotations sensor not depicted in the drawings is incorporated in the motor 121. The number of rotations of the rotor shaft 113 is detected based on a detection signal from the number-of-rotations sensor. Moreover, a phase sensor not depicted in the drawings is attached, for example, near the lower radial sensor 108 to detect the phase of rotation of the rotor shaft 113. The control apparatus uses detection signals from both the phase sensor and the number-of-rotations sensor to detect the positions of the magnetic poles.

A plurality of stator blades 123a, 123b, 123c, . . . is disposed such that a small void is present between each of the stator blades 123a, 123b, 123c, . . . and a corresponding one of the rotor blades 102a, 102b, 102c, . . . . The rotor blades 102a, 102b, 102c, . . . are formed to incline at a predetermined angle to a plane perpendicular to the axis of the rotor shaft 113 so as to transfer molecules of exhaust gas downward which collide against the rotor blades 102a, 102b, 102c, . . . . The stator blade 123 is also formed to incline at the predetermined angle from the plane perpendicular to the axis of the rotor shaft 113 and disposed so as to extend to the center of the outer cylinder 127 and so that stages of the stator blade 123 alternate with corresponding stages of the rotor blade 102.

One end of the stator blade 123 is supported so as to be fitted and inserted between a plurality of stacked stator blade spacers 125a, 125b, 125c, . . . . The stator blade spacer 125 is a ring-shaped member and is formed of metal, for example, aluminum, iron, stainless steel, or copper, or an alloy containing any of these metals as a component.

The outer cylinder 127 is fixed around an outer periphery of the stator blade spacer 125 with a small void between the outer cylinder 127 and the stator blade spacer 125. A base portion 129 is disposed at a bottom portion of the outer cylinder 127. A threaded spacer 131 is disposed between a lower portion of the stator blade spacer 125 and the base portion 129. An outlet port 133 is formed in the base portion 129 and below the threaded spacer 131 so as to communicate with the exterior of the apparatus.

In such a configuration, when the rotor blade 102 is driven by the motor 121 to rotate with the rotor shaft 113, the rotor blade 102 and the stator blade 123 act to suck exhaust gas from the chamber through the inlet port 101.

The turbo-molecular pump needs control based on individually adjusted specific parameters (for example, the identity of a machine type and characteristics corresponding to the machine type). To store the control parameters, the turbo-molecular pump main body 100 includes an electronic circuit section 141. The electronic circuit section 141 is housed near the center of the base portion 129, which provides a lower portion of the turbo-molecular pump main body 100, and below the number-of-rotations sensor not depicted in the drawings. The electronic circuit section 141 is closed by an air-tight bottom cover 145.

Now, the control apparatus will be described. In a control apparatus 300, a rectifier circuit 10 converts an alternating current into a direct current as depicted in FIG. 10. The direct current is converted into three phases by a motor driving main circuit 30 based on a pulse signal adjusted by a motor driving control circuit 20 so that the motor 121 is driven by the converted current.

Power from a rectifier circuit 10 is reduced in voltage by a direct-current stabilizing power supply circuit 40 and then supplied to the motor driving control circuit 20 and to the magnetic bearing control circuit 50. The magnetic bearing control circuit 50 passes an excitation current to each of the electromagnets including the upper radial electromagnet 104, the lower radial electromagnet 105, and the axial electromagnets 106A and 106B.

The excitation current is passed to the pair of electromagnets providing each of the following: the upper radial electromagnet 104, the lower radial electromagnet 105, and the axial electromagnets 106A and 106B, as a constant steady current (bias current) on which a displacement current dependent on a position deviation signal is superimposed.

Now, the motor driving main circuit 30 will be described. As depicted in FIG. 11, a resistor 3 and a transistor 5 located between two power supply lines 1a and 1b are connected to the power supply circuit.

Furthermore, transistors 7, 9, 11, 13, 15, and 17 are located between the two power supply lines 1a and 1b and connected to the power supply lines 1a and 1b in form of a three-phase bridge connection to provide power supply to the motor 121. Diodes 19a to 19g for passage of a regeneration current are each connected between a source and a drain of a corresponding one of the transistors 5 to 17.

A current flowing through the transistors 9, 13, and 17 is detected by a current detecting section not depicted in the drawings to determine a deviation of the current from a motor current command value. Then, a PWM control signal adjusted based on this deviation is input to a gate of each of the transistors 7, 9, 11, 13, 15, and 17.

In such a configuration, the resistor 3 functions as a regeneration resistor to convert regenerated electric power generated by the motor 121 when the rotor 103 is decelerated, into heat for consumption. Japanese Patent Application Laid-open Nos. H7-279962, 2002-180990, and 2004-112877 are known as conventional examples that use the regenerative resistance for the vacuum pump as described above.

When the regeneration resistor is installed in the motor driving main circuit as in the conventional technique, an attachment space is needed through which the heat resulting from the regeneration resistor is transferred. This disadvantageously leads to an increase in the size of the control apparatus. Furthermore, in association with the regeneration resistor, a transistor and a diode that turn on and off a current to the regeneration resistor are needed, resulting in increased costs.

The present invention has been developed in view of the conventional problems described above. An object of the present invention is to provide an electromagnetic rotating apparatus and a vacuum pump having the electromagnetic rotating apparatus in which power generated during regeneration is consumed by an electromagnet winding in the electromagnetic rotating apparatus to allow a reduction in the size of the apparatus and in costs.

Thus, an aspect of the present invention (claim 1) includes a motor; a rotor shaft that is rotationally driven by the motor; an electromagnet through which, as an excitation current, a displacement current generated in accordance with a positional deviation of the rotor shaft and superimposed on a bias current is passed; a power supply that supplies a direct current; a motor driving main circuit that supplies the direct current supplied by the power supply to the motor; a motor voltage monitoring circuit that monitors a voltage of the direct current; detection signal output means for outputting a detection signal when the voltage monitored by the motor voltage monitoring circuit reaches a predetermined value or larger; and a magnetic bearing control circuit that increases the bias current that excites the electromagnet, based on the detection signal that is output by the detection signal output means.

When a voltage applied to the motor driving main circuit is increased by overshoot or the like following arrival at a set speed during regeneration or acceleration, the bias current in the magnetic bearing is increased to allow regenerated electric power to be consumed by an electromagnet winding in a magnetic bearing apparatus. This enables a regeneration resistor to be removed. The removal of the regeneration resistor eliminates the need for an installation space for the regeneration resistor, leading to a miniaturized control apparatus. Furthermore, a switching element that turns on and off the regeneration resistor can be made unnecessary, reducing costs.

Additionally, as aspect of the present invention (claim 2) includes: a motor driving control circuit that controls a motor current passed through the motor in accordance with a command value; and a braking current adjusting circuit that reduces the command value for the motor current, based on the detection signal that is output by the detection signal output means.

When the voltage increases excessively during regeneration or acceleration, an electronic element may be destroyed. Thus, the motor current is adjusted to prevent the voltage from increasing during regeneration or the like. That is, when the voltage to the motor driving main circuit increases, the command value for the motor current is reduced. A reduced current flowing through the motor decreases the voltage during regeneration or the like.

Moreover, an aspect of the present invention (claim 3) is characterized in that the power supply supplies the magnetic bearing control circuit with a direct current of a voltage identical to a voltage supplied to the motor driving main circuit.

When the magnetic bearing control circuit is supplied with the direct current of the voltage identical to the voltage supplied to the motor driving main circuit, a direct-current stabilizing power supply circuit that supplies the direct current to the motor driving control circuit and the magnetic bearing control circuit can be reduced in size.

Moreover, an aspect of the present invention (claim 4) is a vacuum pump including the electromagnetic rotating apparatus set forth in any one of claims 1 to 3, characterized in that a rotor blade is attached to the rotor shaft.

As described above, according to the aspect of the present invention (claim 1), when the voltage monitored by the motor voltage monitoring circuit reaches the predetermined value or larger, the detection signal is output, and based on the detection signal, the bias current, which excites the electromagnets, is increased. Thus, when the voltage applied to the motor driving main circuit increases during regeneration, acceleration, or the like, the electromagnet winding in the magnetic bearing apparatus is allowed to consume regenerated electric power. This enables the regeneration resistor to be removed.

The removal of the regeneration resistor eliminates the need for an installation space for the regeneration resistor, leading to a miniaturized control apparatus. Furthermore, the switching element that turns on and off the regeneration resistor can be made unnecessary, reducing costs.

DETAILED DESCRIPTION

Figure 1:
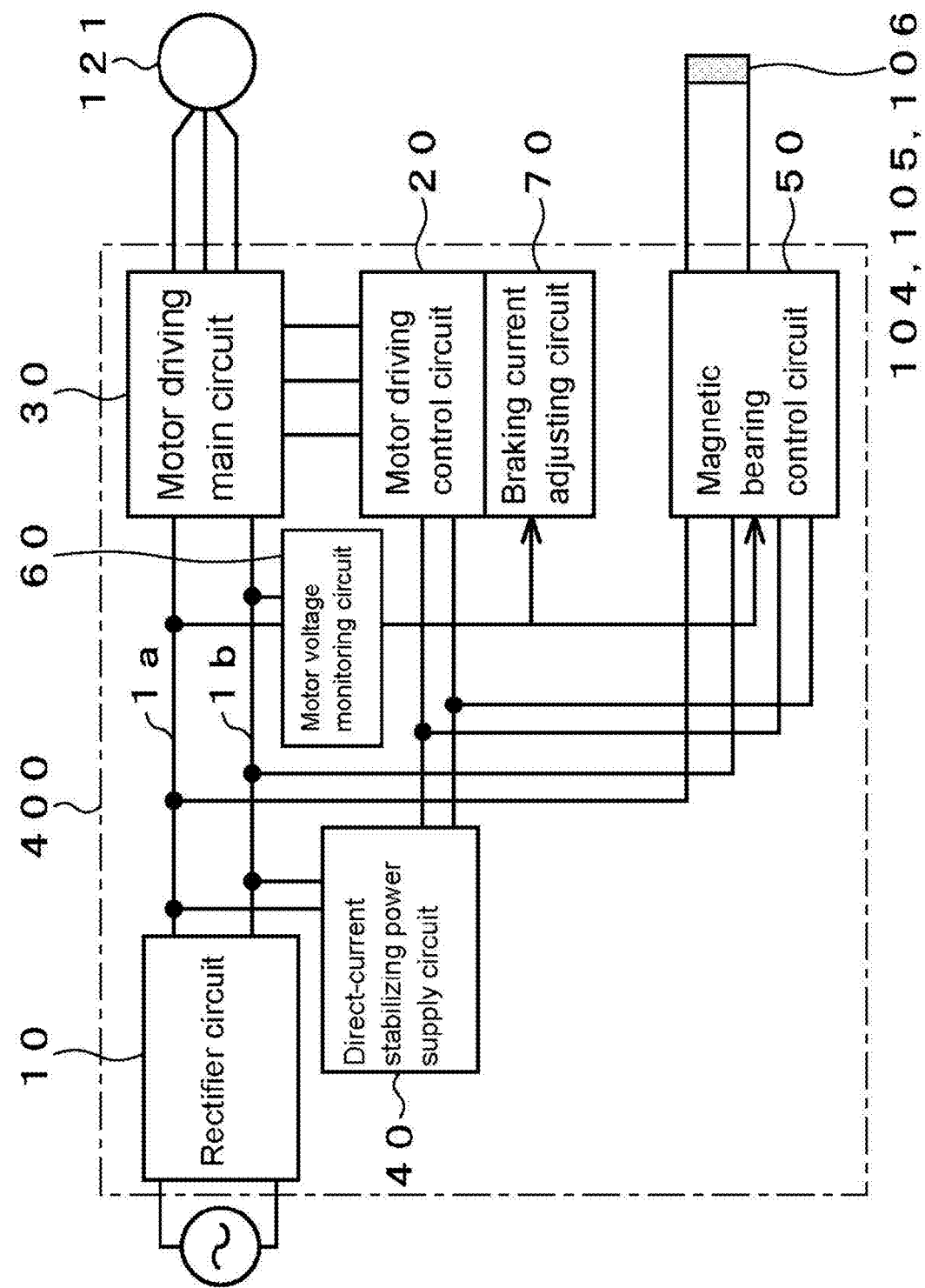
FIG. 1 is a general block diagram of a first embodiment of the present invention.
Figure 10:
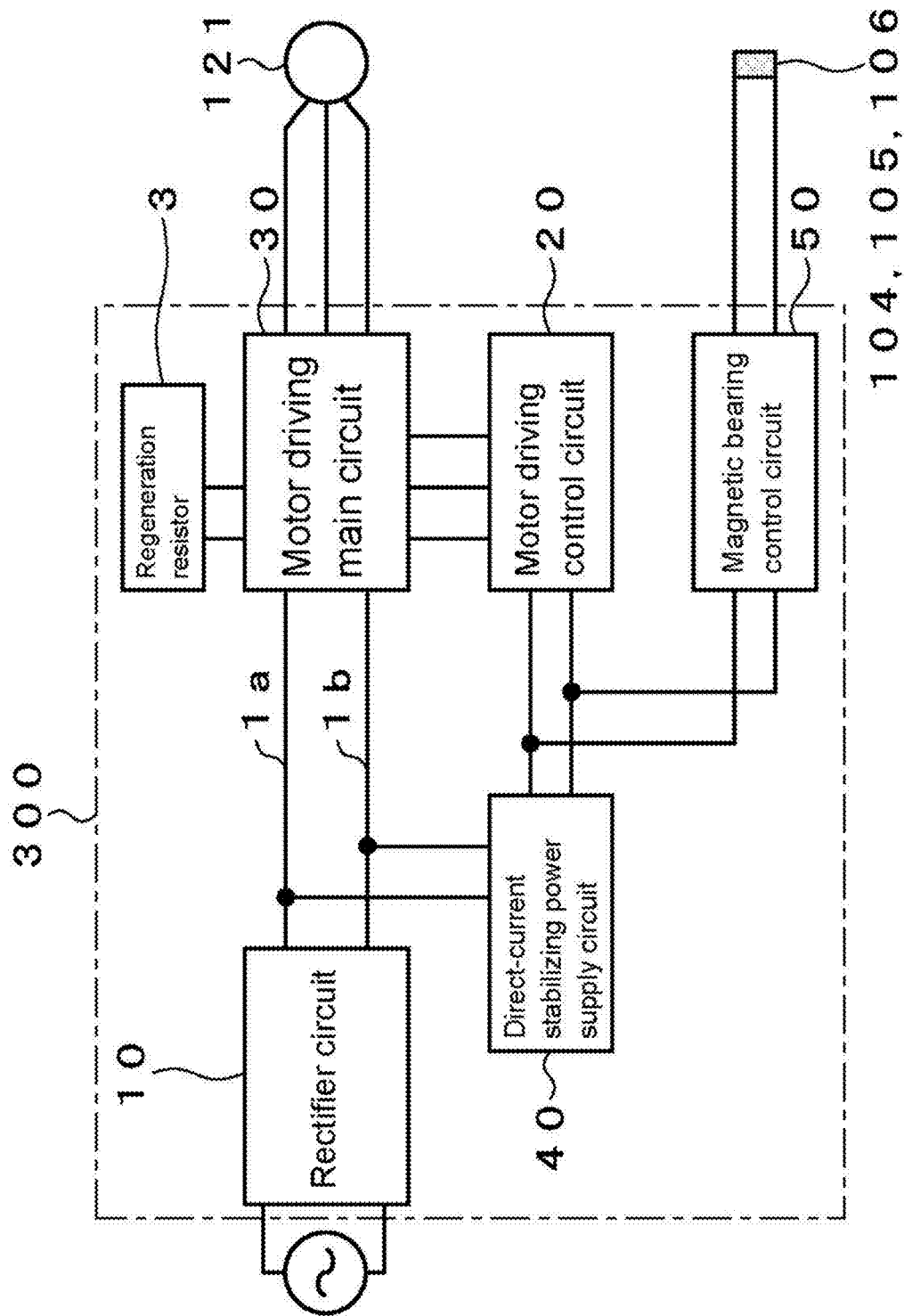
FIG. 10 is a general block diagram of a conventional technique.
Figure 11:
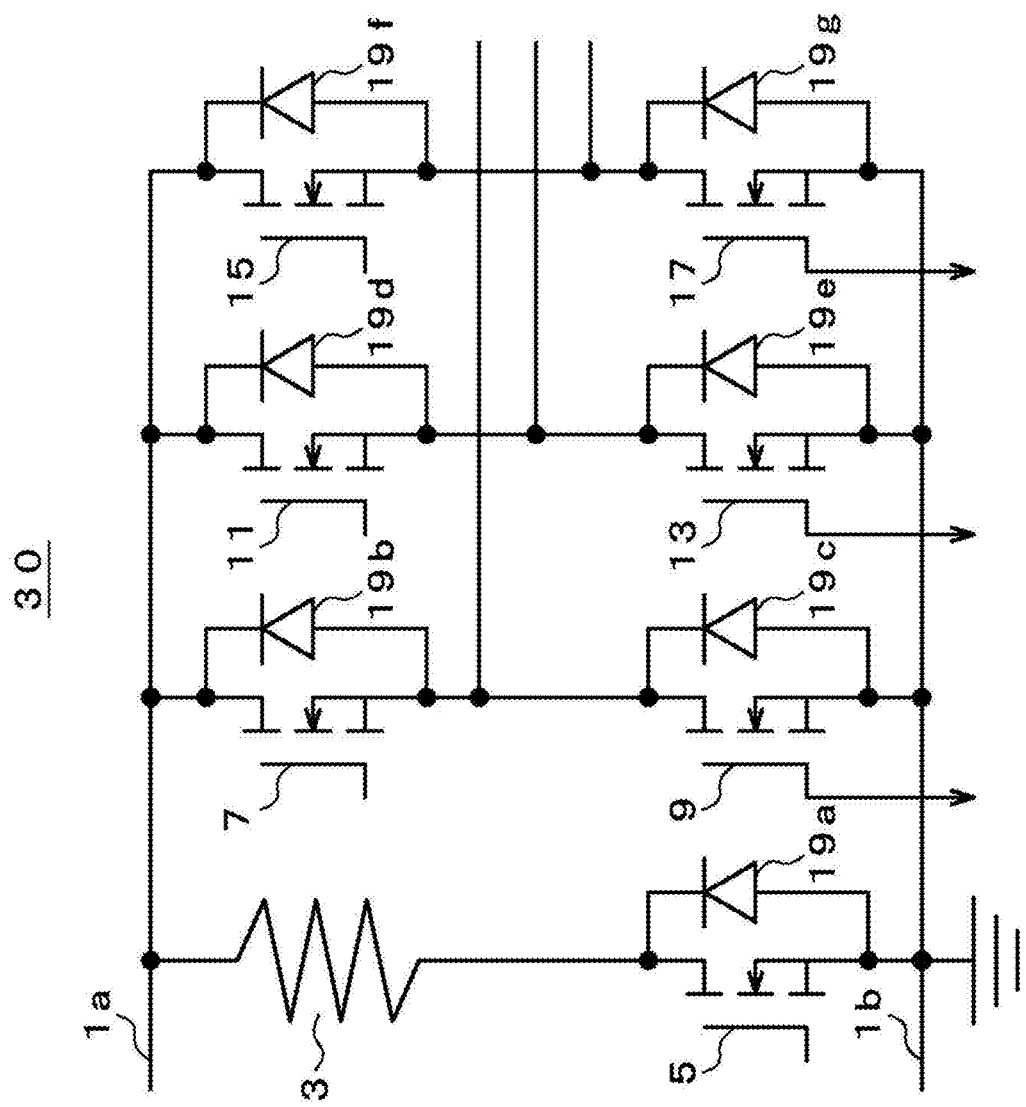
FIG. 11 is a configuration diagram of a motor driving main circuit.

Embodiments of the present invention will be described below. FIG. 1 depicts a general block diagram of a first embodiment of the present invention. Elements of the first embodiment which are identical to the corresponding elements in FIG. 10 are denoted by identical reference numerals and will not be described below.

FIG. 1 depicts that an AC power supply is connected to a rectifier circuit 10 in a control apparatus 400. The rectifier circuit 10 rectifies and converts an alternating current into a direct current of 100 to 150 V. The direct current flows between power supply lines 1*a* and 1*b* and is input to a motor driving main circuit 30. Between the power supply lines 1*a* and 1*b*, a motor voltage monitoring circuit 60 is disposed to monitor a voltage at the motor driving main circuit 30.

The motor voltage monitoring circuit 60 detects that the voltage between the power supply lines 1*a* and 1*b* has become higher than a predetermined voltage during deceleration or acceleration of a motor 121.

Figure 2:
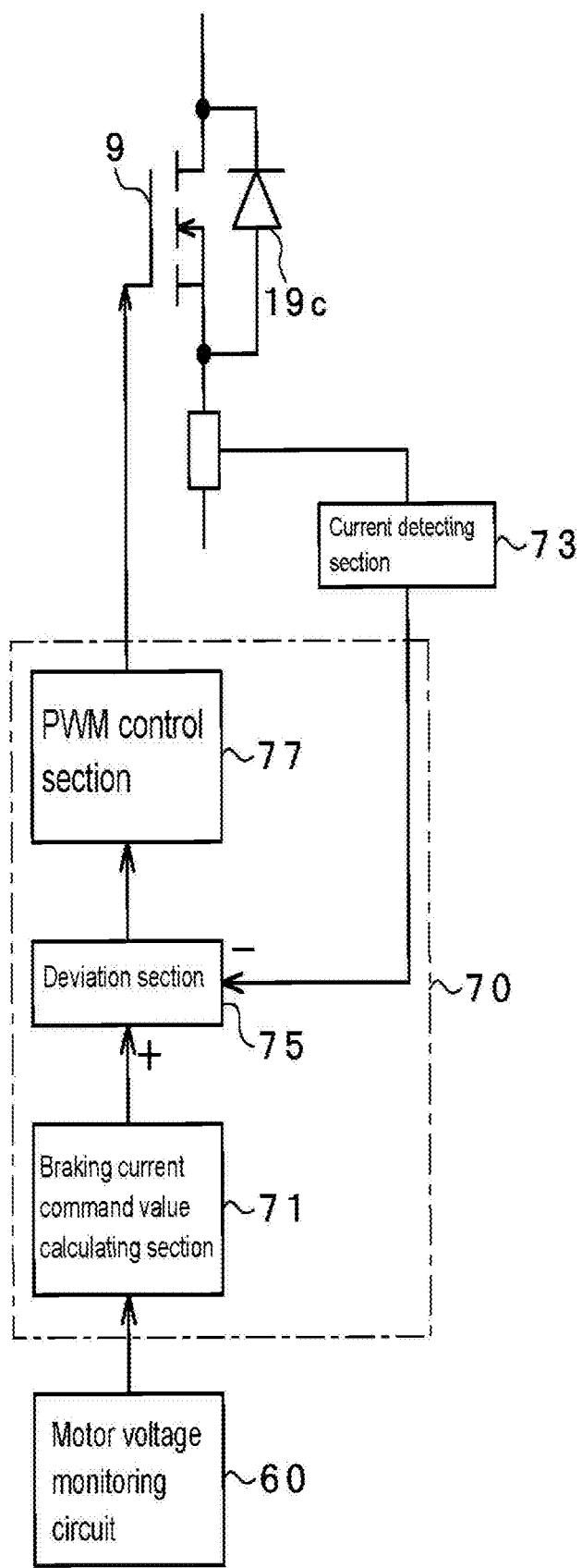
FIG. 2 is a control block diagram for a braking current for a motor.

At this time, the motor voltage monitoring circuit 60 outputs a high-voltage detection signal. The high-voltage detection signal is input to a braking current adjusting circuit 70 and a magnetic bearing control circuit 50. When the high-voltage detection signal is input to the braking current adjusting circuit 70, a braking current command value calculating section 71 depicted in FIG. 2 calculates a command value for a braking current for the motor 121.

A deviation section 75 determines a deviation of the command value for the braking current calculated by the braking current command value calculating section 71 from a current value detected by a current detecting section 73 disposed in series with transistors 9, 13, and 17. A PWM control signal is generated which results from pulse width modulation by a PWM control section 77 based on the deviation.

The PWM control signal is input to a gate of each of the transistors 7, 9, 11, 13, 15, and 17 in the motor driving main circuit 30 to adjust the braking current.

A direct current that is output by the rectifier circuit 10 is reduced to approximately several V by a direct-current stabilizing power supply circuit 40. The resultant direct current is input to the motor driving control circuit 20 and the magnetic bearing control circuit 50 as a control voltage. Furthermore, the voltage between the power supply lines 1*a* and 1*b* is supplied to the magnetic bearing control circuit 50.

Figure 3:
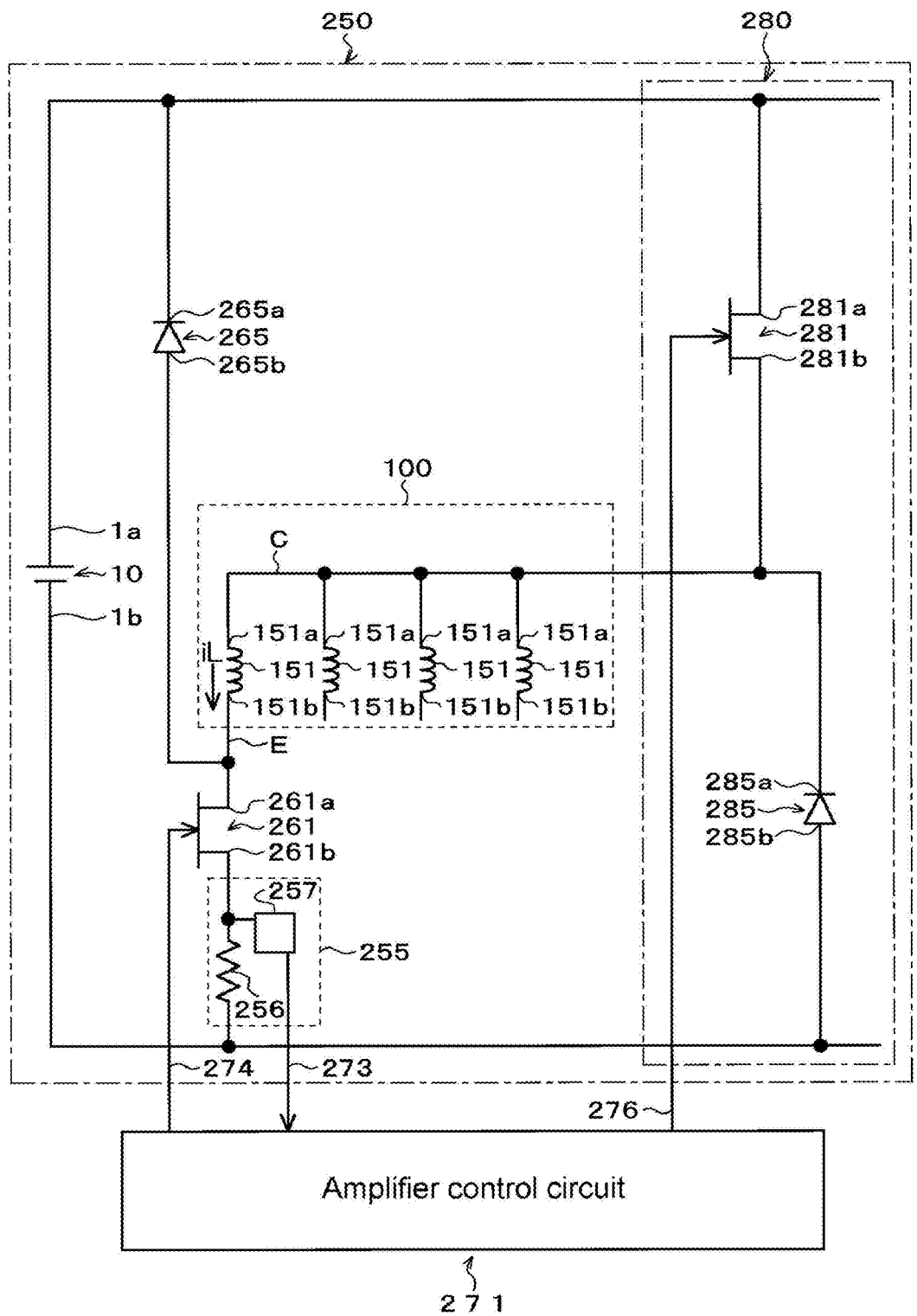
FIG. 3 is a configuration diagram of a magnetic bearing control circuit.

FIG. 3 is a configuration diagram of the magnetic bearing control circuit 50. The magnetic bearing control circuit 50 includes an amplifier circuit 250 and an amplifier control circuit 271. The control voltage from the direct-current stabilizing power supply circuit 40 is input to the amplifier control circuit 271.

FIG. 3 depicts that the turbo-molecular pump main body 100 is provided with a node common to electromagnet windings 151 providing electromagnets 104, 105, 106A, and 106B, respectively (the node is hereinafter referred to as the common node C). Furthermore, each electromagnet winding 151 is connected to the common node C at one end 151a of the winding. Additionally, the electromagnet winding 151 is connected to a transistor 261 and a diode 265 in the amplifier circuit 250 at the other end 151b of the winding (a node at the other end 151b is hereinafter referred to as a node E).

In this regard, the transistor 261 is a power MOSFET with a drain terminal 261a connected to the other end 151b of the electromagnet winding 151 and a source terminal 261b connected a negative pole 1b of the rectifier circuit 10 via a current detecting circuit 255. Furthermore, the diode 265 is a diode for current regeneration or a flywheel including a cathode terminal 265a connected to a positive pole 1a of the rectifier circuit 10 and an anode terminal 265b connected to the other end 151b of the electromagnet winding 151.

The current detecting circuit 255 connected to the source terminal 261b of the transistor 261 has a detection resistor 256 connected to the negative pole 1b at one end of the resistor and to the source terminal 261b of the transistor 261 at the other end of the resistor, and a detection section 257 that detects an electromagnet current iL in a voltage at the other end of the detection resistor 256. The detection section 257 detects the electromagnet current iL flowing through the electromagnet winding 151 to output a current detection signal 273 corresponding to a result of the detection to the amplifier control circuit 271.

The amplifier circuit 250 configured as described above is provided for each of the electromagnet windings 151 providing the electromagnets 104, 105, 106A, and 106B, respectively.

Figure 4:
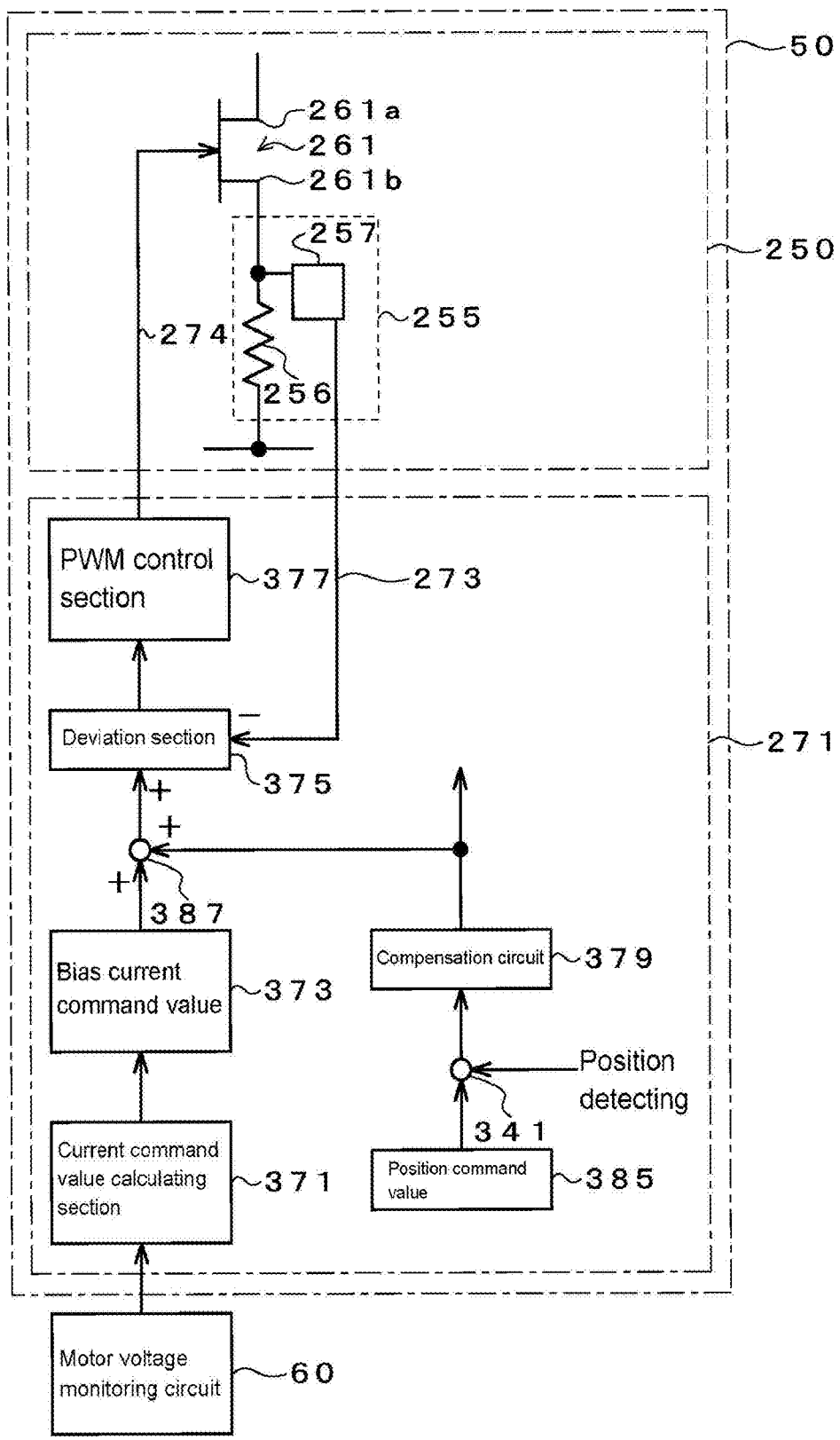
FIG. 4 is a control block diagram for a current passed through an electromagnet winding.

The amplifier control circuit 271 is a circuit in a DSP section (not depicted in the drawings). The high-voltage detection signal detected by the motor voltage monitoring circuit 60 is input to the amplifier control circuit 271 as depicted in FIG. 4. When the high-voltage detection signal is input to the amplifier control circuit 271, a current command value calculating section 371 calculates a command value for a bias current passed through the electromagnet winding 151.

Figure 5:
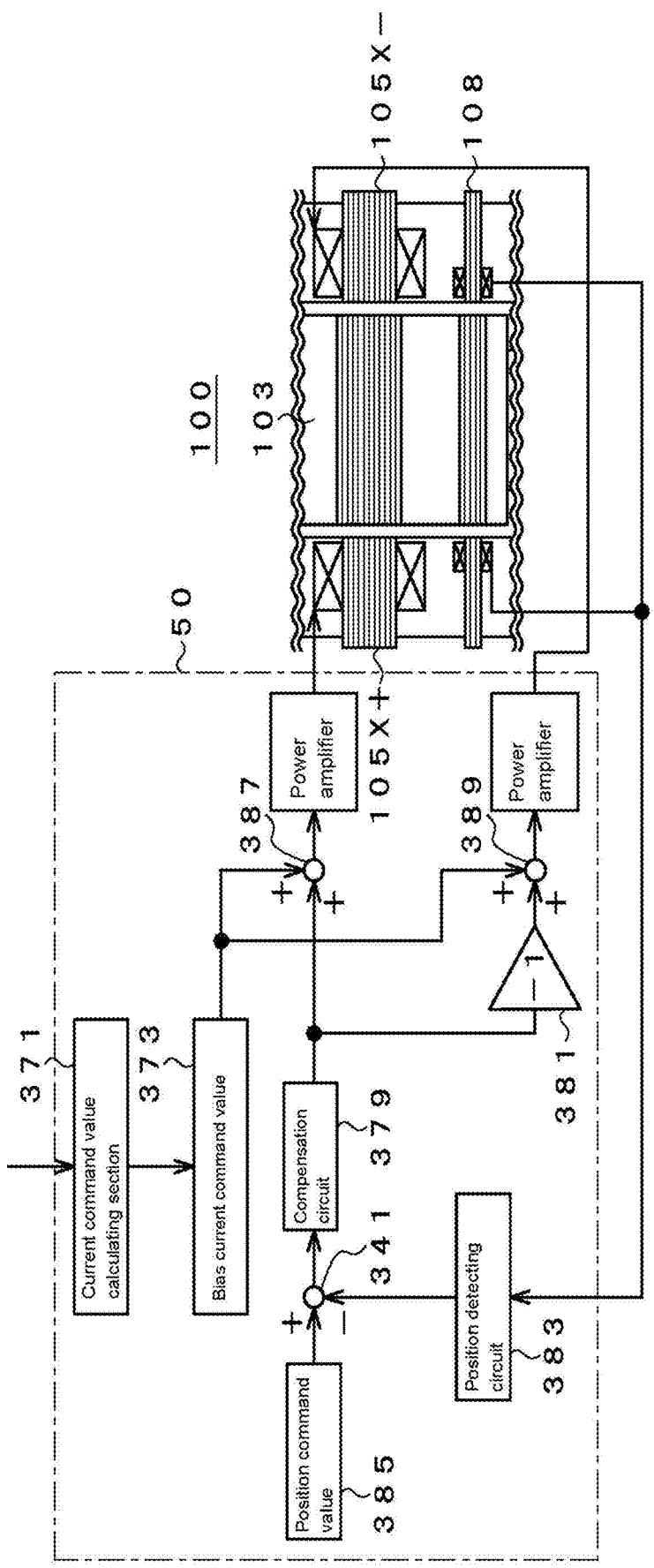
FIG. 5 is a system diagram for control of a radial position.

A bias current command value 373 resulting from the calculation by the current command value calculating section 371 is input to a deviation section 375 after being added in an addition section 387 to one of two signals output by a compensation circuit 379, in order to drive an electromagnet 105X+ providing a lower radial electromagnet 105, as depicted in FIG. 4 and a system diagram for control of a radial position in FIG. 5.

Furthermore, to drive an electromagnet 105X−, the other signal that is output by the compensation circuit 379 is inverted by an inversion circuit 381, and the resultant signal is input to the deviation section 375 after being added in the addition section 389 to the bias current command value 373.

The addition of the bias current command value is intended to linearly perform radial positional control on a rotor 103. That is, a constant direct bias current and a braking current allowing the rotor 103 to be held in position are passed through the electromagnet 105X+ and the electromagnet 105X− in a superimposed manner.

The compensation circuit 379 receives, for example, a deviation, from a position command value 385, of the radial position of the rotor 103 detected by a position detecting circuit 383 in a lower radial sensor 108, which deviation has been calculated by a deviation section 341.

FIG. 4 depicts that the deviation section 375 compares a value for the electromagnet current iL detected by the current detecting circuit 255 with a current command value and that a PWM control section 377 determines a time for which the electromagnet current iL is increased (increase time Tp1 described below) and a time for which the electromagnet current iL is reduced (reduction time Tp2 described below), and based on these times, determines a pulse width time for a gate driving signal 274 output to a gate terminal of the transistor 261 within a control cycle Ts that is one period according to PWM control.

Moreover, FIG. 3 depicts that a switching circuit 280 is connected to the common node C in the amplifier circuit 250. In the switching circuit 280, a transistor 281 and a diode 285 are connected to the common node C.

The diode 285 is a diode for current regeneration or a flywheel including a cathode terminal 285a connected to the common node C and an anode terminal 285b connected to the negative pole 1b as is the case with the amplifier circuit 250. Furthermore, the transistor 281 is a power MOSFET including a drain terminal 281a connected to the positive pole 1a of the rectifier circuit 10 and a source terminal 281b connected to the common node C.

A switching signal 276 from the amplifier control circuit 271 is output to a gate terminal of the transistor 281. The amplifier control circuit 271 determines a pulse width time for the switching signal 276 output to the gate terminal of the transistor 281 within the control cycle Ts as is the case with the control performed on the amplifier circuit 250.

In such a configuration, when the transistor 261 in the amplifier circuit 250 is turned on and the transistor 281 in the switching circuit 280 is turned on, a current flows from the positive pole 1a the transistor 281 through the common node C, the electromagnet winding 151, and the transistor 261 (and the current detecting circuit 255) to the negative pole 1b. Consequently, the current from the positive pole 1a is supplied to the electromagnet winding 151, thus increasing the electromagnet current iL (this state is hereinafter referred to as an increase mode A1).

On the other hand, when the transistor 261 in the amplifier circuit 250 is turned off and the transistor 281 in the switching circuit 280 is turned off, a counter electromotive force is generated in the electromagnet winding 151 to pass regenerated electric power from the negative pole 1b through the diode 285, the common node C, the electromagnet winding 151, and the diode 265 to the positive pole 1a. Thus, electromagnetic energy generated by the electromagnet winding 151 is consumed to reduce the electromagnet current iL (this state is hereinafter referred to as a reduction mode A2).

Moreover, when the transistor 261 in the amplifier circuit 250 is turned on and the transistor 281 in the switching circuit 280 is turned off, a counter electromotive force is generated in the electromagnet winding 151 to pass a flywheel current from the negative pole 1b through the diode 285, the common node C, the electromagnet winding 151, and the transistor 261 (and the current detecting circuit 255) to the negative pole 1b. At this time, no potential difference occurs between the opposite ends 151a and 151b of the electromagnet winding 151, thus maintaining the electromagnet current iL approximately constant (this state is hereinafter referred to as a constant mode A3).

Also in a state other than a state of the constant mode A3, when the transistor 261 in the amplifier circuit 250 is turned off and the transistor 281 in the switching circuit 280 is turned on, a counter electromotive force is generated in the electromagnet winding 151 to pass a flywheel current from the positive pole 1a through the transistor 281, the common node C, the electromagnet winding 151, and the diode 265 to the positive pole 1a. Thus, also in this case, the electromagnet current iL is maintained approximately constant (this state is hereinafter referred to as a constant mode A4).

Figure 6:
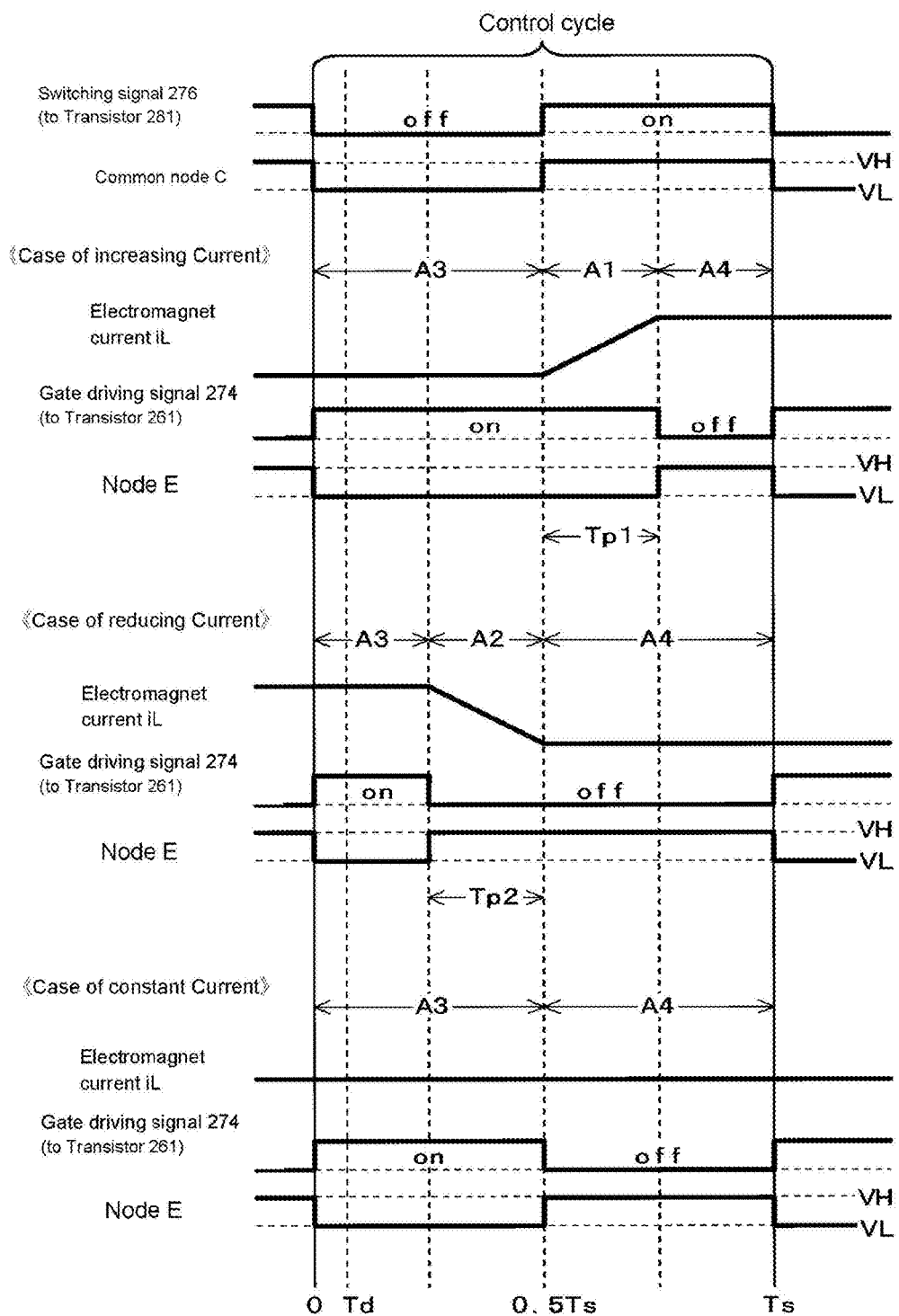
FIG. 6 is a time chart.

FIG. 6 depicts a time chart illustrating adjustment of a control phase provided to the transistor 261 and the like by the amplifier circuit 250 and a switching phase provided to the transistor 281 and the like by the switching circuit 280.

FIG. 6 depicts that the switching circuit 280 is controlled such that, during the control cycle Ts, the time during which the transistor 281 is on is the same as the time during which the transistor 281 is off. In this case, the transistor 281 is on from a point in time corresponding to the beginning of the control cycle Ts (time 0) until a point in time corresponding to the half of the control cycle Ts (time 0.5Ts).

Thus, a voltage at the common node C is substantially the same as a voltage at the negative pole 1b due to, for example, the counter electromotive force generated in the electromagnet winding 151 (this voltage is hereinafter referred to as a voltage VL). On the other hand, the transistor 281 is on from a point in time corresponding to the half of the control cycle Ts (time 0.5Ts) until a point in time corresponding to the end of the control cycle Ts (time Ts). Consequently, the voltage at the common node C is substantially the same as a voltage at the positive pole 1a (this voltage is hereinafter referred to as a voltage VH).

When the value for the electromagnet current iL detected by the current detecting circuit 255 is smaller than the current command value, the amplifier control circuit 271 performs control such that the electromagnet current iL is increased. In this case, control is performed such that, during one control cycle Ts, a state of the increase mode A1 lasts for the above-described increase time Tp1 and a state of one of the constant modes A3 and A4 lasts for the remaining time.

Specifically, the transistor 281 in the switching circuit 280 is on from the time 0.5Ts until the time Ts, and thus, the transistor 261 is on for the time Tp1 beginning at the time 0.5Ts to allow the state of the increase mode A1 to last for the increase time Tp1. Furthermore, when the time Tp1 elapses, the transistor 261 is turned off to establish the state of the constant mode A4.

On the other hand, from the time 0 until the time 0.5Ts, the transistor 281 in the switching circuit 280 is off (that is, the state of the increase mode A1 cannot be established). Consequently, the transistor 261 is turned on to establish the constant mode A3. Thus, during one control cycle Ts, the electromagnet current iL is increased for the increase time Tp1.

On the other hand, when the value for the electromagnet current iL detected by the current detecting circuit 255 is larger than the current command value, the amplifier control circuit 271 performs control such that the electromagnet current iL is reduced. In this case, control is performed such that, during one control cycle Ts, the state of the reduction mode A2 lasts for the above-described reduction time Tp2 and the state of one of the constant modes A3 and A4 lasts for the remaining time.

Specifically, the transistor 281 in the switching circuit 280 is off from the time 0 until the time 0.5Ts, and thus, the transistor 261 is off for the time Tp2 ending at the time 0.5Ts to allow the state of the reduction mode A2 to last for the reduction time Tp2. Furthermore, before the transistor 261 is turned off, the transistor 261 is kept on to maintain the state of the constant mode A3.

On the other hand, from the time 0.5Ts until the time Ts, the transistor 281 in the switching circuit 280 is on (that is, the state of the reduction mode A2 cannot be established). Consequently, the transistor 261 is turned off to establish the constant mode A4. Thus, during one control cycle Ts, the electromagnet current iL is reduced for the reduction time Tp2.

Moreover, when the value for the electromagnet current iL detected by the current detecting circuit 255 matches with the current command value, the amplifier control circuit 271 performs control such that the electromagnet current iL is maintained constant. In this case, control is performed such that one of the constant modes A3 and A4 is constantly present during one control cycle Ts.

Specifically, from the time 0 until the time 0.5Ts, the transistor 281 in the switching circuit 280 is off, and thus, the transistor 261 is turned on to establish the state of the constant mode A3.

On the other hand, from the time 0.5Ts until the time Ts, the transistor 281 in the switching circuit 280 is on, and thus, the transistor 261 is turned off to establish the state of the constant mode A4. Thus, the electromagnet current iL is maintained at a predetermined level.

As described above, the electromagnet current iL can be increased or reduced or maintained constant so as to be equal to the current command value, by controlling the amplifier circuit 250 while controlling the switching circuit 280.

Now, operations of the first embodiment will be described. In FIG. 1, unlike in FIG. 10, the regeneration resistor 3 and the transistor 5 are omitted from the motor driving main circuit 30. Regenerated electric power consumed by the regeneration resistor 3 according to the conventional technique is consumed by the electromagnet winding 151.

Figure 7:
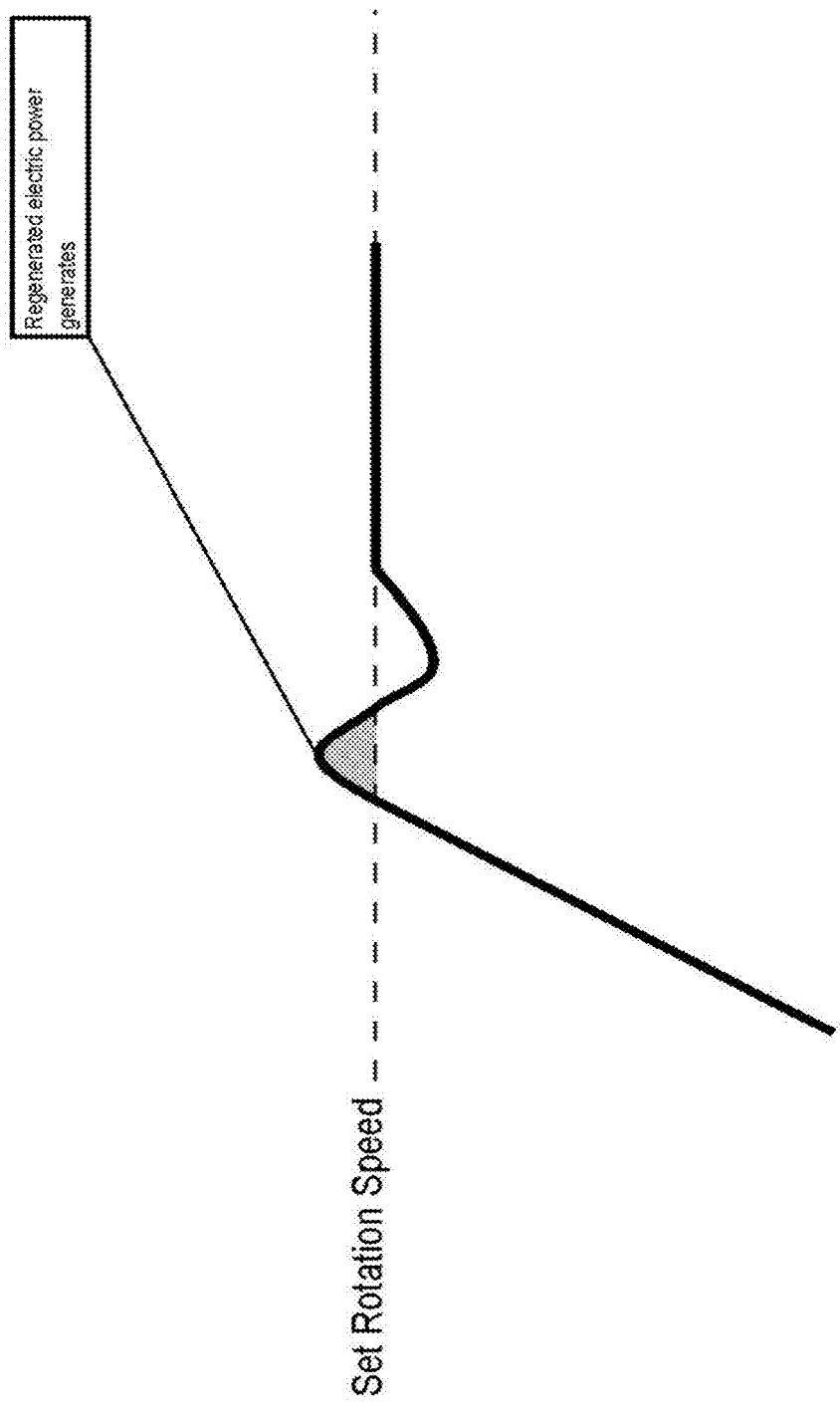
FIG. 7 is a diagram indicating how regenerated electric power is generated during acceleration.

When the energy consumed by the electromagnet winding 151 is not equal to all of the energy consumed by the regeneration resistor 3 according to the conventional technique, then without the regeneration resistor 3, the voltage at the motor driving main circuit 30 increases when a regenerative current flows at the time of overshoot following arrival at a set rotation speed during deceleration of the motor 121 or during acceleration the motor 121 as depicted in FIG. 7. When the voltage thus increases, an electronic element may be broken. Consequently, an increase in voltage needs to be prevented by adjusting the braking current.

Thus, when the voltage at the motor driving main circuit 30 becomes at least 10 to 20% higher during deceleration or acceleration of the motor 121 than during normal operation, the motor voltage monitoring circuit 60 detects this state and transmits a high-voltage detection signal to the braking current adjusting circuit 70 and the magnetic bearing control circuit 50.

Upon receiving the high-voltage detection signal, the braking current adjusting circuit 70 reduces a braking current command value for the motor 121 so as to maintain the excitation voltage constant or reduce the excitation voltage. A deviation, from the braking current command value, of a current flowing through transistors 9, 13, and 17 is determined. A PWM control signal adjusted based on the deviation is input to a gate of each of the transistors 7, 9, 11, 13, 15, and 17. At this time, a braking current flowing through the motor 121 decreases, and the reduced braking current lowers regenerated electric power generated between power supply lines 1a and 1b.

On the other hand, upon receiving the high-voltage detection signal, the amplifier control circuit 271 in the magnetic bearing control circuit 50 calculates a current command value including a bias current so as to increase the current flowing through the electromagnet winding 151 by a factor of approximately 1.2 to 3 compared to the bias current during the normal operation. That is, when the voltage at the motor driving main circuit 30 increases, the current including the bias current and flowing through the electromagnet winding 151 is increased, thereby increasing power consumption.

As described above, even when the regeneration resistor 3 is removed, the regenerated electric power may be consumed and the pump may be stably stopped. Furthermore, the removal of the regeneration resistor 3 eliminates the need for an installation space for the regeneration resistor, leading to the size reduction of a control apparatus. Additionally, a switching element that turns on and off the regeneration resistor 3 can be made unnecessary, reducing costs.

The regeneration resistor 3 is removed in the above description but may be left. In this case, the electromagnet winding 151 side consumes most of the regenerated energy, enabling a reduction in the capacities of the regeneration resistor 3 and the switching element that turns the regeneration resistor 3 on and off. Furthermore, the pump may be quickly stopped.

The high-voltage detection signal is represented as a reference character but may be represented as a consecutive voltage value. Alternatively, the high-voltage detection signal may be represented as a reference character generated in a step-by-step manner in accordance with the level of the voltage value. The consecutive voltage value enables the braking current and the bias current to be consecutively adjusted. The step-by-step reference character allows the adjustment of the braking current and the bias current to be changed in a step-by-step manner.

Figure 8:
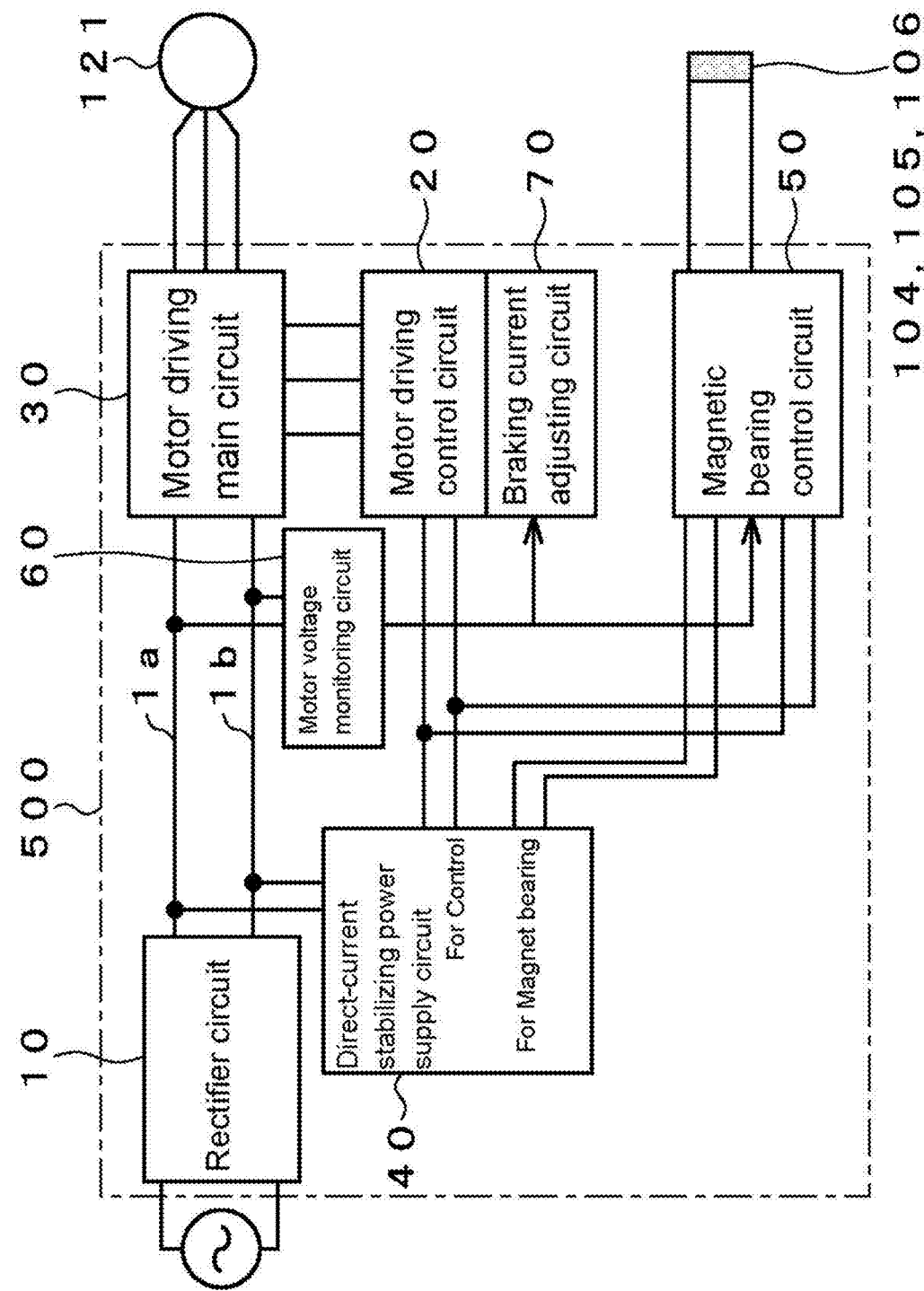
FIG. 8 is a general block diagram of a second embodiment of the present invention.
Figure 9:
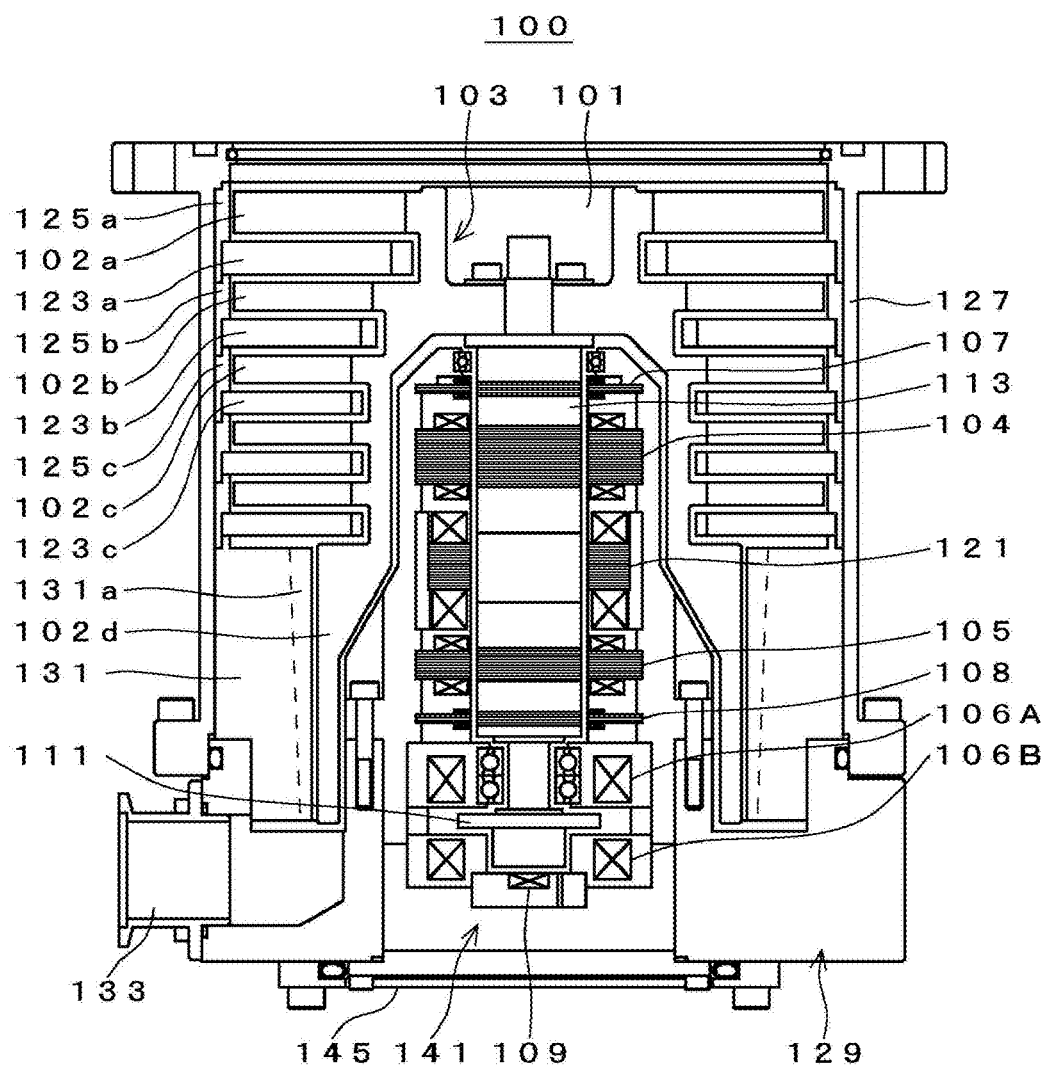
FIG. 9 is a longitudinal cross-sectional view of a turbo-molecular pump main body.

Now, a second embodiment of the present invention will be described. FIG. 8 depicts a general block diagram of the second embodiment of the present invention. The same elements as those in FIG. 1 are denoted by the same reference numerals and will thus not be described.

Control apparatus 500 in FIG. 8 is different from the control apparatus in FIG. 1 in that, in the former case, the direct current between the power supply lines 1a and 1b is supplied to the magnetic bearing control circuit 50, whereas, in the latter case, a DC voltage reduced down to 40 to 60 V by the direct-current stabilizing power supply circuit 40 is supplied to the magnetic bearing control circuit 50. One direct-current stabilizing power supply circuit 40 can be branched into a circuit for control and a circuit for a magnetic bearing. However, the direct-current stabilizing power supply circuit 40 has a larger capacity in the second embodiment than in the first embodiment.

EXPLANATION OF REFERENCE NUMERALS

1: Power supply line; 3: Regeneration resistor; 5 to 17, 261, 281: Transistor; 10: Rectifier circuit; 20: Motor driving control circuit; 30: Motor driving main circuit; 40: Direct-current stabilizing power supply circuit; 50: Magnetic bearing control circuit; 60: Motor voltage monitoring circuit; 70: Braking current adjusting circuit; 71: Braking current command value calculating section; 73: Current detecting section; 75, 375: Deviation section; 77, 377: PWM control section; 100: Turbo-molecular pump main body; 102: Rotor blade; 104: Upper radial electromagnet; 105: Lower radial electromagnet; 106A, 106B: Axial electromagnet; 113: Rotor shaft; 121: Motor; 151: Electromagnet winding; 250: Amplifier circuit; 255: Current detecting circuit; 256: Detection resistor; 257: Detection section; 265, 285: Diode; 271: Amplifier control circuit; 273: Current detection signal; 274: Gate driving signal; 276: Switching signal; 280: Switching circuit; 300, 400, 500: Control apparatus; 371: Current command value calculating section; 373: Bias current command value.

What is claimed is:

1. A vacuum pump comprising:
   a motor;
   a rotor shaft that is rotationally driven by the motor;
   an electromagnet through which, as an excitation current, a displacement current generated in accordance with a positional deviation of the rotor shaft and superimposed on a bias current is passed;
   a power supply that supplies a direct current;
   a motor driving main circuit that supplies the direct current supplied by the power supply to the motor;
   a motor voltage monitoring circuit that monitors a voltage of the direct current;
   detection signal output means for outputting a detection signal when the voltage monitored by the motor voltage monitoring circuit reaches a predetermined value or a value larger than the predetermined value; and
   a magnetic bearing control circuit that increases the bias current that excites the electromagnet, based on the detection signal that is output by the detection signal output means, wherein a regenerated electric power generated by a rotation of the rotor shaft is consumed by increasing the bias current of the electromagnet.

2. The vacuum pump according to claim 1, further comprising:
   a motor driving control circuit that controls a motor current passing through the motor in accordance with a command value; and
   a braking current adjusting circuit that reduces the command value for the motor current, based on the detection signal that is output by the detection signal output means.

3. The vacuum pump according to claim 2, wherein the power supply supplies the magnetic bearing control circuit with a direct current of a voltage substantially identical to a voltage supplied to the motor driving main circuit.

4. The vacuum pump according to claim 1, wherein the power supply supplies the magnetic bearing control circuit with a direct current of a voltage identical to a voltage supplied to the motor driving main circuit.

5. A vacuum pump comprising an electromagnetic rotating apparatus comprising:
   a motor;
   a rotor shaft that is rotationally driven by the motor;
   a rotor blade attached to the rotor shaft;
   an electromagnet through which, as an excitation current, a displacement current generated in accordance with a positional deviation of the rotor shaft and superimposed on a bias current is passed;
   a power supply that supplies a direct current;
   a motor driving main circuit that supplies the direct current supplied by the power supply to the motor;
   a motor voltage monitoring circuit that monitors a voltage of the direct current;
   detection signal output means for outputting a detection signal when the voltage monitored by the motor voltage monitoring circuit reaches a predetermined value or a value larger than the predetermined value; and
   a magnetic bearing control circuit that increases the bias current that excites the electromagnet, based on the detection signal that is output by the detection signal output means, wherein a regenerated electric power generated by a rotation of the rotor shaft is consumed by increasing the bias current of the electromagnet.

6. The vacuum pump of claim 5, wherein the electromagnetic rotating apparatus further comprises:
   a motor driving control circuit that controls a motor current passing through the motor in accordance with a command value; and
   a braking current adjusting circuit that reduces the command value for the motor current, based on the detection signal that is output by the detection signal output means.

7. The vacuum pump of claim 6, wherein the power supply supplies the magnetic bearing control circuit with a direct current of a voltage identical to a voltage supplied to the motor driving main circuit.

8. The vacuum pump of claim 5, wherein the power supply supplies the magnetic bearing control circuit with a direct current of a voltage identical to a voltage supplied to the motor driving main circuit.

* * * * *